Dec. 8, 1931. F. STONER 1,834,985
INDUSTRIAL TRUCK
Filed May 11, 1927 3 Sheets-Sheet 2
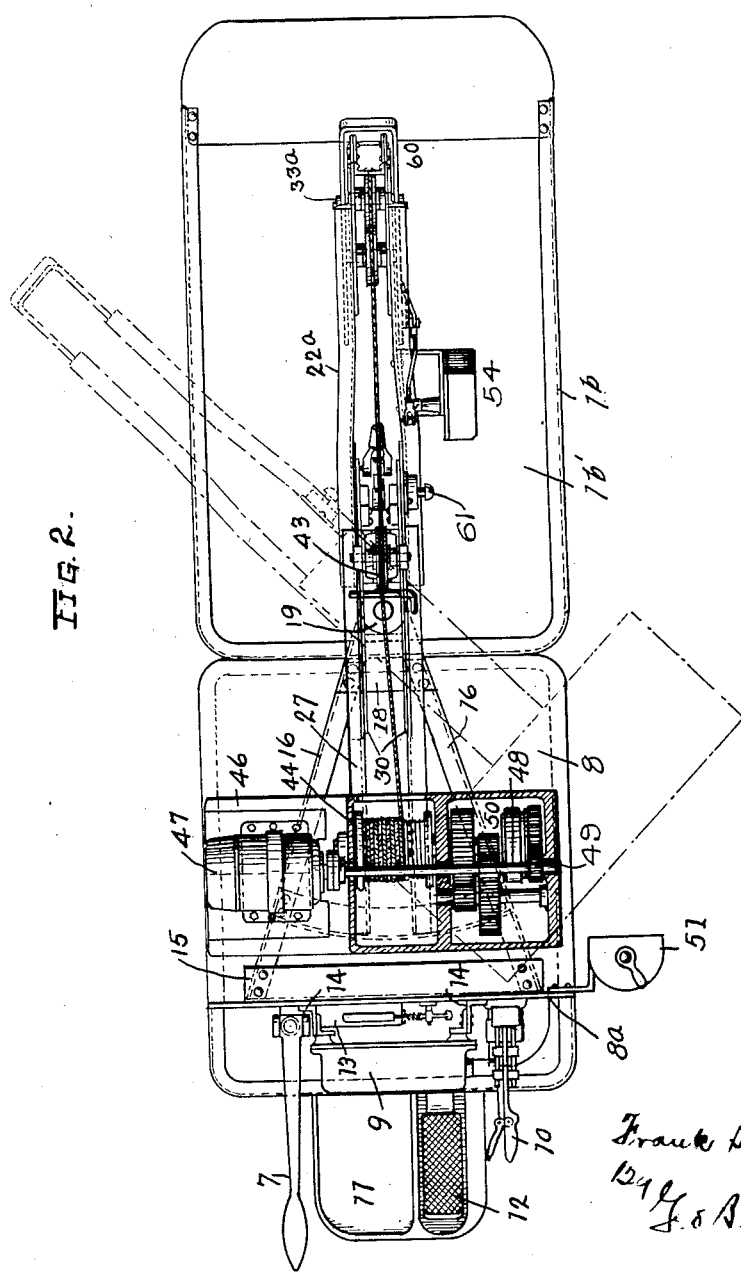
Inventor
Frank Stoner
By F. S. Pitts
Attorney Dec. 8, 1931.  F. STONER  1,834,985
INDUSTRIAL TRUCK
Filed May 11, 1927  3 Sheets-Sheet 3
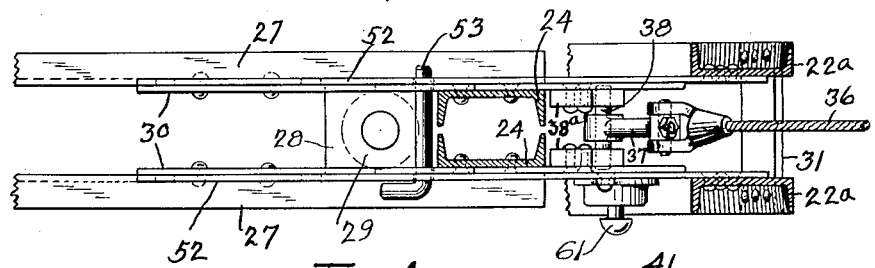
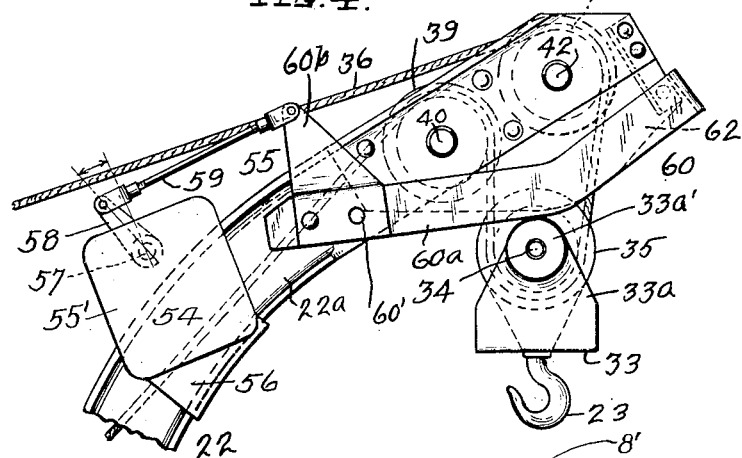
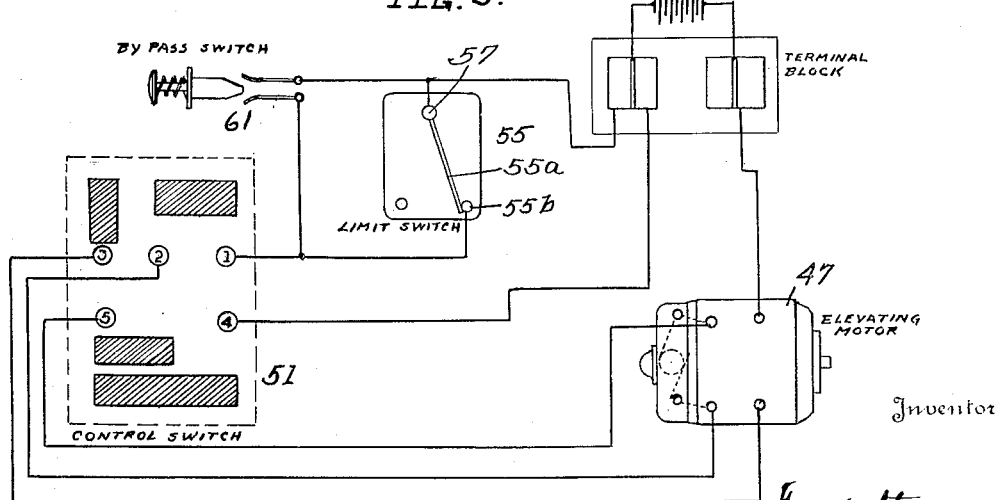

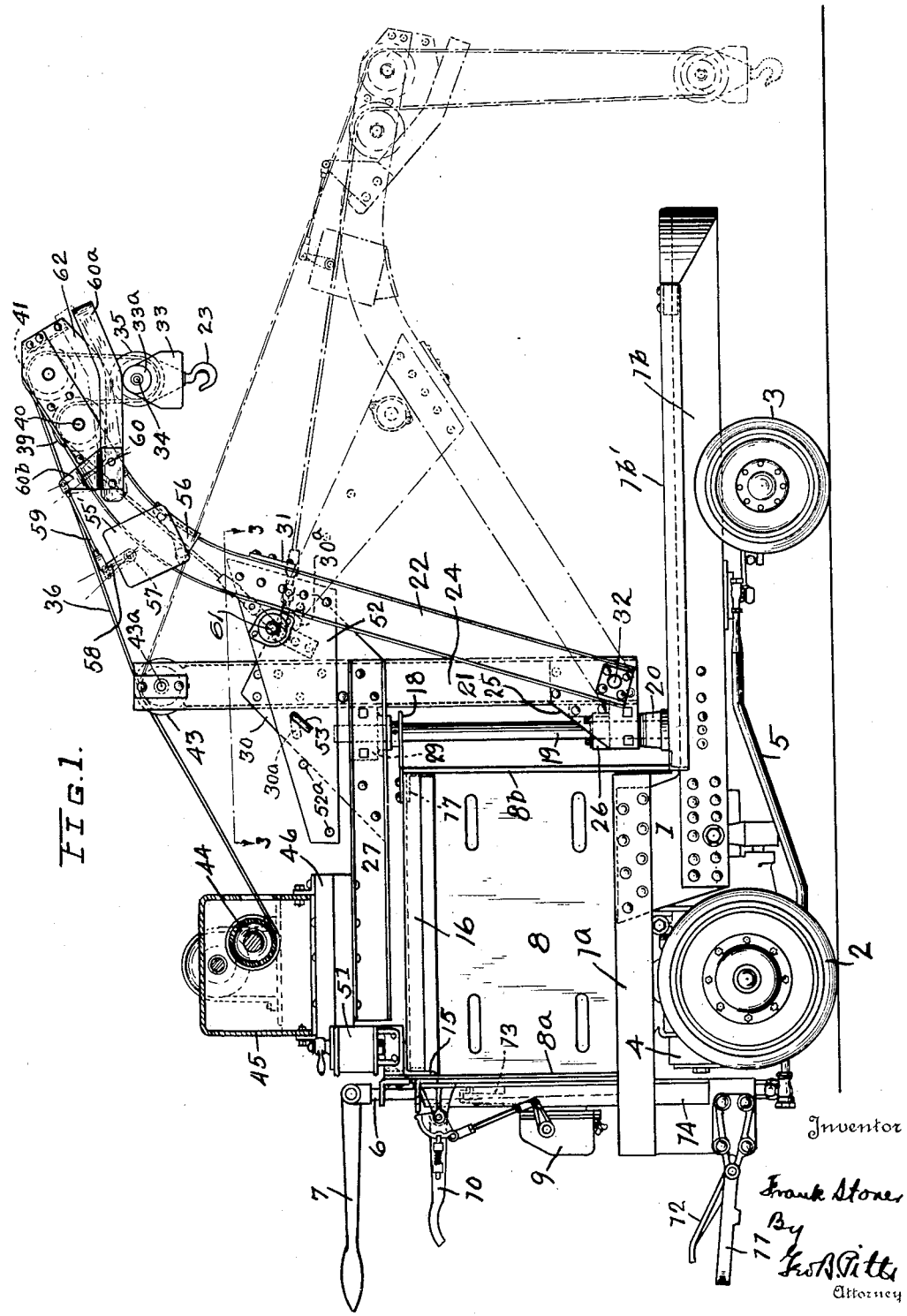

Patented Dec. 8, 1931

1,834,985

UNITED STATES PATENT OFFICE

FRANK STONER, OF LAKEWOOD, OHIO, ASSIGNOR TO THE BAKER-RAULANG COMPANY, OF CLEVELAND, OHIO, A CORPORATION OF OHIO

INDUSTRIAL TRUCK

Application filed May 11, 1927. Serial No. 190,447.

This invention relates to an industrial truck of the crane type for handling bodies and transporting the same from place to place.

One object of the invention is to provide an improved truck of this character capable of picking up and transporting a body or discharging it in a ready manner.

Another object of the invention is to provide in a truck of this character an improved crane and control means therefor whereby the handling of loads is greatly facilitated with respect to time and labor.

Other objects of the invention will be apparent to those skilled in the art to which my invention relates from the following description taken in connection with the accompanying drawings, wherein—

Fig. 1 is a side elevation of a truck embodying my invention.

Fig. 2 is a plan view.

Fig. 3 is a section on the line 3—3 of Fig. 1.

Fig. 4 is a fragmentary side view of the upper portion of the boom and load lifting device and showing the position of certain parts when the limit means is actuated.

Fig. 5 is a diagram of the electric wiring.

In the drawings, 1 indicates as an entirety a suitable frame, mounted on wheels 2, 3. I preferably provide one pair of wheels 2 at or near the driving end of the frame and a pair of wheels 3 at or near the load carrying end thereof. The wheels 2 are driven by an electric motor 4 through suitable power transmitting means (not shown) and both pairs of wheels 2, 3, by preference, are pivotally mounted for steering purposes and operatively connected through a suitable steering gear 5, the latter being connected to a steering column 6 operated by a handle 7. The frame 1 may consist of a main portion 1a on which the electric batteries are positioned (said batteries being enclosed in a casing 8) and a load carrying portion 1b. A platform 1b' may be stationarily mounted on the load carrying portion 1b, as shown, or it may be mounted to move upwardly and downwardly thereon, such for example as shown in Letters Patent No. 1,536,127 granted to John H. Hertner. 9 indicates a suitable controller for the motor 4, operated by a handle 10. 11 indicates a platform on which the operative stands. 12 indicates a foot pedal associated with the platform 11 and arranged, when depressed, to release a suitable brake (not shown) normally applied to a brake element driven by the motor 4 as is usual in trucks of this general character. 13 indicates a safety switch mechanism operatively connected with the brake pedal 12 and controlled thereby in a manner to prevent operation of the motor 4 except when the brake pedal is depressed, this mechanism preferably being similar in construction to that shown in the application of Edward H. Remde, Serial No. 536,296, filed February 13, 1922. 14 indicates a pair of upright angles rigidly connected to the frame portion 1a and supporting the controller 9 and the front wall 8a of the casing 8. The upper portion of the wall 8a carries an angle 15 and the latter has connected to it the outer ends of converging frame members 16. The inner ends of the frame members 16 are rigidly connected by an angle 17 to the rear wall 8b of the casing 8 and to each other by a web 18. The wall 8b is rigidly secured at its lower end to the frame 1 in any desired manner. The outer end of the web 18 is formed with an opening through which extends the upper end of a shaft 19 (see Fig. 1). 20 indicates a standard preferably fixed in any suitable manner to the platform 1b' and formed with an opening which receives the lower end of the shaft 19.

21 indicates as an entirety a support swingably mounted on the shaft 19, whereby the boom 22, which is pivotally mounted on the support 21, and its load engaging device 23 may be positioned at either side of the frame 1, as shown in Fig. 2, in carrying out certain operations. Of the support 21, 24 indicates a pair of vertical channels having at their lower ends a pair of gussets 25. Between the gussets is mounted a spacing block having an opening for the shaft 19 and an up-standing annular wall forming a hub 26 on which the block rotates. 27 indicates a pair of horizontal channels connected at one end to the channels 24 and extending over the casing 8 toward the driving end of the frame 1. Between the channels 27 is mounted a block 28 having a hub 29 rotatably fitting the shaft 19 and co-operating with the hub 26 to swingably mount the support 21 thereon. As will be understood, the blocks just referred to serve to maintain the channels 24 and 27 in spaced relation. 30 indicates locking plates, each rigidly secured to one of the channels 27 and the adjacent channel 24 and formed with a plurality of aligned openings 30a, the purpose of which will later appear.

The boom 22 may comprise a pair of channels 22a, 22a, suitably connected in spaced relation by one or more cross members 31, and preferably curved outwardly at their upper or free ends. The lower ends of the channels 22a are formed with aligned openings to receive the outer ends of a pivot pin 32 which extends through openings formed in the gussets 25 and channels 24, the pin being removably held against endwise movement by a pair of collars secured to the pin by set screws and engaging the inner opposing faces of the channels 24.

The load engaging device 23 in the embodiment herein illustrated comprises a suitable hook swiveled on and depending from a support 33 having side members 33a. The side members 33a support a shaft 34 on which is mounted a reeving element 35 for a flexible member, such as a cable 36, adapted to raise and lower the load engaging device 23 and boom 22 in the usual manner. The cable 36 is connected at one end to a link 37 and the link in turn is pivotally mounted on a pin 38, which is supported at its ends by plates 38a carried on the inner faces of the lock plates 30. The cable 36 reeves around a sheave 39 mounted on a shaft 40 carried by the boom, then around the sheave 35 and then around a second sheave 41 mounted on a shaft 42 also carried by the boom 22. From the sheave 41, the cable 36 extends over and around a guide sheave 43 and then to a drum 44 on which it winds and unwinds to operate the boom 22 and load engaging device 23. The drum 44 is mounted in a casing 45 which is secured in a suitable manner to a base 46. The base 46 is supported upon the outer ends of the channels 27, being fixed thereon in any preferred way. 47 indicates a motor mounted on the base 46. The shaft 48 of the motor 47 carries a pinion 49 which drives a suitable gear reduction 50 and the latter in turn rotates the drum 44 in either direction. 51 indicates a suitable controller for the motor 47. The guide sheave 43 is preferably mounted on a shaft 43a the ends of which are supported in the channels 24 and maintained midway between them by suitable collars. As shown in Fig. 2, the drum 44 is arranged so that the cable 36 in winding on and off thereof will not be moved out of substantial alignment with the sheave 43.

52 indicates a pair of locking plates carried by the boom 22 and movable relative to the plates 30. As will be more clearly understood from Fig. 3, the plates 52 are disposed in vertical planes parallel to the plates 30 so that when the boom 22 is swung upwardly, for example to the position shown in Fig. 1, each plate 52 will be in substantially face to face relation with the adjacent plate 30. The plates 52 are formed with a plurality of pairs of aligned openings 52a each of which pairs is adapted to register with either pair of openings 30a and when in such registry these openings are adapted to receive a locking pin 53 (see Figs. 1 and 3) and thus adjustably lock the plates 30—52, 30—52, together to secure the boom 22 against movement about its pivot 32 in either direction for carrying out certain operations as will later appear.

54 indicates as an entirety a limit means operable to stop the motor 47 when the load engaging device 23 is raised to its highest position, that is, into engagement with the boom 22. Of these means, 55 indicates a switch having contacts 55a, 55b, through which the circuit is established between the batteries within the casing 8 and motor 47. The switch is enclosed in a casing 55′ preferably supported on a bracket 56 carried by one of the channels 22a. The details of this switch are not shown, but it is preferably similar in construction to that disclosed in a co-pending application Ser. No. 523,286, filed Dec. 23, 1921, filed by Edward H. Remde, except that only one pair of contacts are required since the circuit is only opened when the motor is operating to raise the device 23. The operating element of the switch is carried by a rock shaft 57 and this shaft carries an arm 58 to which one end of a link 59 is pivotally connected. The opposite end of the link 59 is pivotally connected to an operating member 60 movably mounted on the boom 32 and disposed in the path of movement of the support 33 when the latter is raised by the cable 36. The operating member preferably consists of a bell crank fulcrumed at 60′ on the boom. The long arm 60a of the bell crank 60 comprise a U-shaped member the sides of which are disposed on the outer sides of the boom channels (see Fig. 2) and substantially in the planes of movement of the sides 33a or integral bosses 33a′ provided thereon; the short arm 60b may comprise a plate fixed to one of the sides of the arm 60a, as clearly shown in Fig. 4. The weight of the arm 60a will normally maintain the member 60 in the position shown in Fig. 1 in full lines provided the load engaging device 23 is lowered sufficiently.

In Fig. 1 the dotted lines show the plates 52 connected to the plates 30 and supporting the boom in one operating position so that the load engaging device 23 may engage and lift a load or discharge the same beyond the frame 1. In raising a load, if the device is raised high enough by failure to cut out the motor 47 or otherwise, the support therefor will engage the arm 60a and operate it, as shown in Fig. 4 and the latter will actuate the switch 55 and thus stop the motor 47 without causing any damage.

61 indicates a separate switch connected in the motor circuit, in parallel with the switch contacts 55a, 55a, and arranged to close the circuit when or after it has been opened by the switch or limit means 55. The switch 51 is preferably mounted on the boom on one of the plates 52 to permit its convenient operation as will later appear.

From the foregoing description it will be understood that when the load is raised to or approximately to its highest point, as shown in Fig. 4, the motor circuit is opened by the automatic operation of the limit means 55, and operation of the controller 51 will be ineffective except to operate the motor in the direction to lower the device 23 and its load. However, when it is desired to raise the boom or adjust it to a higher position, for example to adjust the boom to the position shown in full lines in Fig. 1, so that the load may be lowered to and discharged on the platform 1b' or lifted therefrom, such adjustment of the boom to carry out the operations referred to may be effected by operating the separate switch 61, since the latter is connected in the motor circuit in parallel with the switch contacts 55a, 55a, as shown in Fig. 5. In making such adjustment, the controller 51 is operated and the load raised until the device 23 engages with and operates the member 60, as shown in Fig. 4; then the operative removes the lock pin 53 from the openings in the plates 30—52, 30—52, and presses in the switch 61. The boom 22 will then swing upwardly and when moved to the desired position the switch is released (being preferably operated by a spring to open the circuit) and the pin 53 inserted in the openings 30a, 52a, in the locking plates then in registry to lock the boom against movement in either direction. The load engaging device 23 may then be operated in the usual manner. The switch 61 is mounted on the boom or one of the locking plates in order that it may be readily operated in conjunction with the removal and replacement of the lock pin 53. To avoid strains on the operating member incident to the raising or lowering of the boom 22, I provide it with one or more abutment plates 62 with which the sides of the support 33 or the bosses 33a' thereon engage during such operation. In lowering the boom to the position shown in dotted lines in Fig. 1, the device 23 is first raised and the motor circuit opened thereby; then the lock pin 53 is removed; then the controller 51 is operated to pay out the cable until the boom swings downwardly to the desired position; then the motor is stopped and the lock pin inserted in the registering openings.

It will be understood that while I have shown two plates 30 and two plates 52, the locking of the boom in any of its adjusted positions may be effected by the use of one plate 30 and one plate 52 and a device for locking them against relative movement.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

What I claim is:

1. In a power driven industrial truck, the combination of a wheel mounted frame, a boom pivotally mounted thereon to swing upwardly and downwardly, a flexible member having its outer portion depending from the outer end of said boom, a load engaging device carried by the free end of said flexible member, members carried by said frame and boom, means engaging said members to lock said boom against movement in either direction, means for effecting pull upon or paying out of said flexible member for raising and lowering said device, said means including an electric motor, limit means actuated by said device when elevated to a predetermined position to open the circuit for said motor, and a separate switch connected to the motor circuit in parallel with the limit means and serving to effect operation of said motor to swing said boom about its pivot.

2. In a power driven industrial truck, the combination of a wheel mounted frame having a load carrying portion, a boom mounted on said frame inwardly of the load carrying portion and arranged to swing upwardly and downwardly, a load engaging device, a flexible member depending from said boom and engaging said device, power means for effecting pull upon or paying out of said flexible member to raise and lower said device, members carried by said frame and boom, means detachably connecting said members together to hold them against movement in either direction, limit means arranged to stop the power means when said device is raised to a predetermined position, and separate means operable to effect continued operation of said power means after said limit means has been actuated to swing said boom about its pivot.

3. In a power driven industrial truck, the combination of a wheel mounted frame, a boom pivotally mounted thereon to swing upwardly and downwardly, a flexible member having its outer portion depending from the outer end of said boom, a load engaging device carried by the outer end of said flexible member, members carried by said frame and boom, means detachably connecting said members together to hold them against movement in either direction, means for effecting pull upon or paying out of said flexible member for raising and lowering said device, said means including an electric motor, limit means actuated by said device when elevated to a predetermined position to open the circuit for said motor, and a separate switch connected to the motor circuit in parallel with the limit means and serving to effect operation of said motor to swing said boom about its pivot, said separate switch being mounted in position for operation when said detachable means are operated.

4. In a power driven industrial truck, the combination of a wheel mounted frame, a boom pivotally mounted thereon to swing upwardly and downwardly, a flexible member having its outer portion depending from the outer end of said boom, a load engaging device, a pair of plates on said frame and formed with pairs of aligned openings, a pair of plates on said boom and formed with pairs of aligned openings, each of the last mentioned pair of openings being adapted to register with certain pairs of openings formed in the first mentioned plates, a device removably fitting the pairs of openings when moved into registry, means for effecting pull upon or paying out of said flexible member for raising and lowering said device, said means including an electric motor, limit means actuated by said device when elevated to a predetermined position to open the circuit for said motor, and a separate switch connected to the motor circuit in parallel with the limit means and serving to effect operation of said motor to swing said boom about its pivot.

In testimony whereof, I have hereunto subscribed my name.

FRANK STONER.